US011971327B2

(12) United States Patent
Yamagata et al.

(10) Patent No.: US 11,971,327 B2
(45) Date of Patent: Apr. 30, 2024

(54) LEAK DIAGNOSIS METHOD AND LEAK DIAGNOSIS DEVICE FOR BLOWBY GAS TREATMENT DEVICE OF INTERNAL COMBUSTION ENGINE

(71) Applicant: NISSAN MOTOR CO., LTD., Yokohama (JP)

(72) Inventors: Toshihiro Yamagata, Kanagawa (JP); Akihito Takahashi, Kanagawa (JP); Shimpei Yamashita, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 282 days.

(21) Appl. No.: 17/632,328

(22) PCT Filed: Jun. 2, 2020

(86) PCT No.: PCT/JP2020/021694
§ 371 (c)(1),
(2) Date: Feb. 2, 2022

(87) PCT Pub. No.: WO2021/245769
PCT Pub. Date: Dec. 9, 2021

(65) Prior Publication Data
US 2022/0276113 A1    Sep. 1, 2022

(51) Int. Cl.
*G01M 3/26*   (2006.01)
*F01M 13/02*  (2006.01)
*G01M 3/02*   (2006.01)

(52) U.S. Cl.
CPC .......... *G01M 3/025* (2013.01); *F01M 13/028* (2013.01); *G01M 3/26* (2013.01); *F01M 2250/00* (2013.01)

(58) Field of Classification Search
CPC ...... G01M 3/26; G01M 3/025; F01M 13/028; F01M 2250/00; F01M 11/10; F02M 25/06
See application file for complete search history.

(56) References Cited

U.S. PATENT DOCUMENTS 8,393,315 B2      3/2013   Ruppel et al.
11,401,844 B2 *   8/2022   Komaki ................. F02M 25/06
(Continued)

FOREIGN PATENT DOCUMENTS

EP    4 159 980 A1       4/2023
EP    4159980 A1 *       4/2023   ............. F01M 11/10
(Continued)

*Primary Examiner* — Jamel E Williams
(74) *Attorney, Agent, or Firm* — Foley & Lardner LLP (57) ABSTRACT

A blowby gas treatment device includes a pressure control valve, a fresh air induction pipe, a first blowby gas pipe, a second blowby gas pipe, a shutoff valve, a one-way valve, and a PCV valve. A leak diagnosis includes a first-stage diagnosis to determine whether or not falling of a pressure in a crank case after closing of the shutoff valve under a non-supercharging condition is normal. A second-stage diagnosis is implemented by using an air fuel ratio feedback control, and determining whether or not a sensed intake air quantity obtained by an air flow meter is equal to an actual intake air quantity flowing into a cylinder set. When the sensed intake air quantity is equal to the actual intake air quantity, presence of an in-system leak is determined, and when the actual intake air quantity is larger, presence of an out-of-system leak is determined.

7 Claims, 8 Drawing Sheets

(56) References Cited

U.S. PATENT DOCUMENTS

| | | | |
|---|---|---|---|
| 11,624,676 B2 | 4/2023 | Yamagata et al. | |
| 2022/0276113 A1 * | 9/2022 | Yamagata | F01M 13/0011 |
| 2022/0291074 A1 * | 9/2022 | Yamagata | F02D 41/18 |

FOREIGN PATENT DOCUMENTS

| | | | | |
|---|---|---|---|---|
| JP | 2010-511835 A | | 4/2010 | |
| JP | 2018-44486 A | | 3/2018 | |
| JP | 2020-012436 A | | 1/2020 | |
| WO | WO-2021245769 A1 * | 12/2021 | | F01M 11/10 |

* cited by examiner

LEAK DIAGNOSIS METHOD AND LEAK DIAGNOSIS DEVICE FOR BLOWBY GAS TREATMENT DEVICE OF INTERNAL COMBUSTION ENGINE

TECHNICAL FIELD

The present invention relates to a blowby gas treatment device of an internal combustion engine for inducing blowby gas from a crank case into combustion chambers for treatment, and relates particularly to a device for diagnosing presence or absence of gas leaking from piping of the blowby gas treatment device.

BACKGROUND ART

A typical blowby gas treatment device of an internal combustion engine is configured to induce fresh air into a crank case from an intake passage or the like via a fresh air induction pipe, and induce the fresh air and blowby gas from the crank case into the intake passage via a blowby gas pipe, and finally supplies the fresh air and blowby gas to combustion chambers. A patent document 1 discloses a normal aspiration engine provided with no supercharging device, in which a tip end of a blowby gas pipe is connected to a section of an intake passage downstream of a throttle valve so as to cause a flow of blowby gas by means of a negative pressure. A typical blowby gas pipe is provided with a PCV valve, wherein the PCV valve is configured to be opened by a differential pressure between an inside of a crank case and an intake passage (a downstream side of a throttle valve).

On the other hand, a patent document 2 discloses a blowby gas treatment device suitable for a supercharging engine provided with a supercharger, in which in addition to a blowby gas pipe connected to a downstream side of a throttle valve, a second blowby gas pipe is provided for inducing blowby gas from a crank case into an upstream side of a compressor while supercharging is active. This blowby gas treatment device includes a fresh air induction pipe and the two blowby gas pipes, wherein each of the blowby gas pipes is provided with a one-way valve for preventing gas from inversely flowing.

If such a blowby gas treatment device undergoes a leak due to occurrence of a hole in a pipe or detachment of a pipe, it is required to immediately detect the leak and allow the leak to be recognized by turning on a warning light or so in order to prevent deleterious blowby gas from being released into an environment. Especially for a vehicular internal combustion engine, it is required by regulations in many regions to diagnose leaking from piping, and in response to an abnormality, turn on a warning light.

Patent document 1 discloses a leak diagnosis to close the fresh air induction pipe temporarily for leak diagnosis, and monitor falling of a pressure in the crank case after the closing of the fresh air induction pipe. As induction of fresh air is stopped while the internal combustion engine is rotating, a negative pressure downstream of the throttle valve is applied to the inside of the crank case, so that without occurrence of a hole in a pipe or detachment of a pipe, the pressure in the crank case falls gradually. Accordingly, when the pressure fall in the crank case is insufficient, presence of some leaking is determined.

However, if such a leak diagnosis method is applied to a supercharging engine and the leak diagnosis method is performed under a non-supercharging condition, it is possible that a failure in a system of a blowby gas treatment device, which is not a leak in the strict sense, namely, not a leak to the outside of the system of the blowby gas treatment device, is detected erroneously as a leak due to occurrence of a hole in a pipe or detachment of a pipe. For example, when the one-way valve of the second blowby gas pipe in patent document 2 is stuck in an open state, fresh air inflows via the second blowby gas pipe so that the pressure fall in the crank case may be insufficient.

The presence of an out-of-system leak due to occurrence of a hole in a pipe or detachment of a pipe results in release of deleterious blowby gas to the environment, whereas an in-system failure such as open-state sticking of the one-way valve as described above does not result in an outflow of blowby gas to the external environment. The two kinds of leaks are different in seriousness, but it is impossible to distinguish the two kinds of leaks from each other by applying a conventional diagnosis to a supercharging engine.

PRIOR ART DOCUMENT(S)

Patent Document(s)

Patent Document 1: Japanese Patent Application Publication No. 2018-44486
Patent Document 2: Japanese Patent Application Publication No. 2010-511835

SUMMARY OF INVENTION

According to the present invention, a leak diagnosis method is presented for a blowby gas treatment device of an internal combustion engine, wherein the blowby gas treatment device includes: a fresh air induction pipe structured to induce fresh air into a crank case from a section of an intake passage downstream of an air flow meter; a pressure control valve disposed in a section of the intake passage upstream of a throttle valve and upstream of a compressor; a first blowby gas pipe structured to induce blowby gas from the crank case into a section of the intake passage between the compressor and the pressure control valve; a second blowby gas pipe structured to induce blowby gas from the crank case into a section of the intake passage downstream of the compressor and downstream of the throttle valve; a shutoff valve structured to block the fresh air induction pipe; a one-way valve structured to allow only a gas flow in the first blowby gas pipe from the crank case to the intake passage; and a PCV valve disposed in the second blowby gas pipe.

According to the present invention, the leak diagnosis method includes: performing a first diagnosis to close the shutoff valve under a non-supercharging condition and determine whether falling of a pressure in the crank case after the closing of the shutoff valve is normal or abnormal; and performing a second diagnosis to determine whether or not a sensed intake air quantity is equal to an actual intake air quantity under the non-supercharging condition, wherein the sensed intake air quantity is a quantity of intake air sensed in the intake passage, and wherein the actual intake air quantity is a quantity of intake air flowing into a cylinder set.

The leak diagnosis method further includes: determining presence of a leak to an outside of a system of the blowby gas treatment device, in response to a condition that the first diagnosis determines the falling of the pressure as abnormal and the second diagnosis determines the sensed intake air quantity as unequal to the actual intake air quantity; and determining presence of a failure within the system of the blowby gas treatment device, in response to a condition that the first diagnosis determines the falling of the pressure as abnormal and the second diagnosis determines the sensed intake air quantity as equal to the actual intake air quantity.

In this way, according to the present invention, it is possible to identify a leak to the outside of the system of the blowby gas treatment device in which blowby gas flows out to the external environment, and a failure within the system of the blowby gas treatment device such as a leak through a valve, and allow those to be easily addressed.

MODE(S) FOR CARRYING OUT INVENTION

Figure 1:
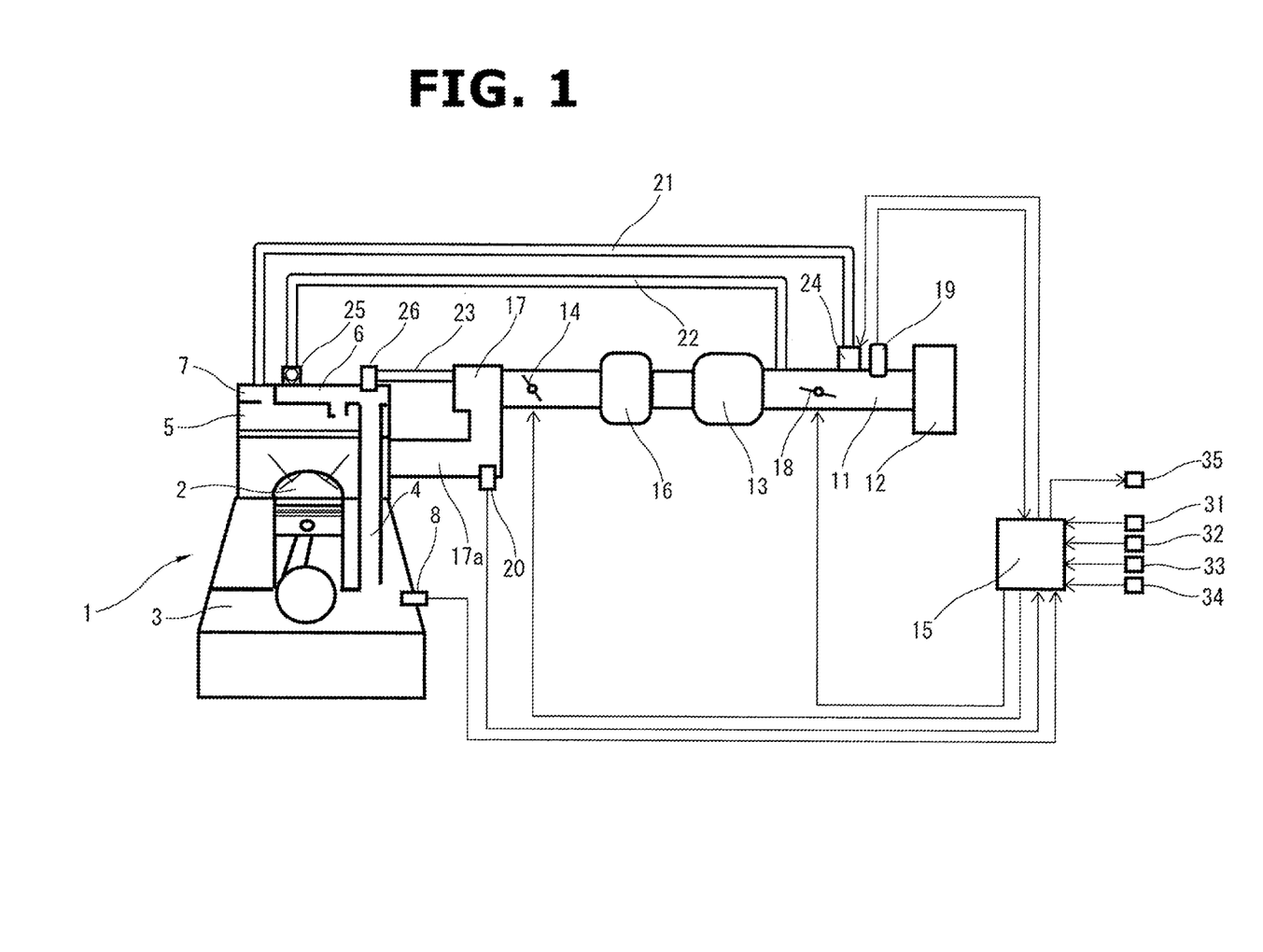
FIG. 1 is an explanatory diagram showing system configuration of a blowby gas treatment device provided with a leak diagnosis device according to an embodiment.

FIG. 1 shows system configuration of a blowby gas treatment device of an internal combustion engine 1 and a leak diagnosis device according to the present invention. The internal combustion engine 1 according to this embodiment is a spark ignition engine provided with a turbocharger as a supercharger. In the internal combustion engine 1, gas containing an unburned component, namely, blowby gas, leaks from a combustion chamber 2 of each cylinder into a crank case 3. This blowby gas is induced via a blowby gas passage 4 into a first oil separator chamber 6, wherein the blowby gas passage 4 is formed in the internal combustion engine 1 to extend in a vertical direction, and wherein the first oil separator chamber 6 is formed in a top part of a cylinder head cover 5. The top part of the cylinder head cover 5 is formed with a second oil separator chamber 7 in addition to the first oil separator chamber 6. The second oil separator chamber 7 communicates with a space in a cylinder head, wherein the space communicates with the crank case 3.

The internal combustion engine 1 is provided with a crank case pressure sensor 8 that is located in a suitable position in the internal combustion engine 1 and senses pressure in the crank case 3.

The internal combustion engine 1 includes an intake passage 11 having an inlet as an upstream end provided with an air cleaner 12 and including an intermediate section provided with a compressor 13. A throttle valve 14 is located downstream of the compressor 13 for controlling an intake air quantity of the internal combustion engine 1. The throttle valve 14 is an electronically controlled throttle valve whose opening is controlled by an engine controller 15, wherein the throttle valve 14 includes an electric actuator such as an electric motor. An intercooler 16 is disposed between the compressor 13 and the throttle valve 14 for cooling intake air compressed by the compressor 13. The throttle valve 14 is located upstream of an intake collector 17. A plurality of intake branch pipes 17a are branched from the intake collector 17, wherein each intake branch pipe 17a reaches a corresponding cylinder. The intake collector 17 is provided with a boost pressure sensor 20 for sensing an intake pressure (boost pressure).

In a section of the intake passage 11 upstream of the compressor 13, a pressure control valve 18 is provided for generating a negative pressure in a region between the pressure control valve 18 and the compressor 13. The pressure control valve 18 is a butterfly valve similar to the throttle valve 14. In order to generate a negative pressure as required in accordance with an operating condition of the internal combustion engine 1, the opening of the pressure control valve 18 is controlled via an electric actuator by the engine controller 15. For sensing the intake air quantity of the internal combustion engine 1, an air flow meter 19 is located upstream of the pressure control valve 18, namely, between the pressure control valve 18 and the air cleaner 12. The air flow meter 19 is a hot-wire air flow meter in this example, but may be of another type.

The blowby gas treatment device includes three pipes by external piping. Specifically, the pipes include a fresh air induction pipe 21, a first blowby gas pipe 22, and a second blowby gas pipe 23, wherein the fresh air induction pipe 21 induces fresh air into the crank case 3, wherein the first blowby gas pipe 22 induces blowby gas into a section of the intake passage 11 upstream of the compressor 13, and wherein the second blowby gas pipe 23 induces blowby gas into a section of the intake passage 11 downstream of the throttle valve 14.

The fresh air induction pipe 21 includes: a first end connected to a section of the intake passage 11 upstream of the pressure control valve 18, wherein the first end is an upstream end in terms of a flow of fresh air; and a second end connected to the second oil separator chamber 7 of the internal combustion engine 1, wherein the second end is a downstream end in terms of the flow of fresh air. A shutoff valve 24 is provided at the upstream end of the fresh air induction pipe 21, namely, at a portion of the fresh air induction pipe 21 connected to the intake passage 11, for blocking the fresh air induction pipe 21 for leak diagnosis. The shutoff valve 24 is an on-off electromagnetic valve and is opened and closed by the engine controller 15. During normal operation of the internal combustion engine 1, the shutoff valve 24 is in an open state allowing fresh air to be induced into the crank case 3 via the fresh air induction pipe 21. The air flow meter 19 is located upstream of a portion of the intake passage 11 connected to the fresh air induction pipe 21, and is structured to measure as an intake air quantity a flow rate of gas containing fresh air flowing into the fresh air induction pipe 21.

The first blowby gas pipe 22 includes: a first end connected to the first oil separator chamber 6 of the internal combustion engine 1, wherein the first end is an upstream end in terms of a flow of blowby gas; and a second end connected to a section of the intake passage 11 between the pressure control valve 18 and the compressor 13, wherein the second end is a downstream end in terms of the flow of blowby gas. A one-way valve 25 is provided at a point of connection between the first blowby gas pipe 22 and the first oil separator chamber 6, for allowing only a gas flow from the crank case 3 (the first oil separator chamber 6) to the intake passage 11. The one-way valve 25 is a mechanical check valve having a valve element that has a conical shape and is opened and closed by a differential pressure in this example. The one-way valve 25 prevents an inverse flow from the intake passage 11 to the crank case 3.

The second blowby gas pipe 23 includes a first end connected to the first oil separator chamber 6 of the internal combustion engine 1, wherein the first end is an upstream end in terms of a flow of blowby gas; and a second end connected to a section of the intake passage 11 downstream of the throttle valve 14, specifically, connected to the intake collector 17, wherein the second end is a downstream end in terms of the flow of blowby gas. A PCV valve 26 is provided at a point of connection between the second blowby gas pipe 23 and the first oil separator chamber 6, for mechanically adjusting a flow rate of blowby gas in accordance with a differential pressure. The PCV valve 26 also serves as a check valve to prevent a gas flow from the intake collector 17 to the first oil separator chamber 6.

The engine controller 15 receives input of sensing signals from various sensors and the like, wherein the sensors include: the air flow meter 19; an accelerator opening sensor 31 for indicating an amount of depression of an accelerator pedal by a driver; a crank angle sensor 32 for indicating a rotational speed of the internal combustion engine 1; an air fuel ratio sensor 33 for sensing an exhaust air fuel ratio in an exhaust passage not shown (oxygen sensor, or so-called wide-range air fuel ratio sensor); and a water temperature sensor 34 for indicating a cooling water temperature.

The engine controller 15 performs various controls such as a control of fuel injection quantity and timing by a fuel injection valve not shown of the internal combustion engine 1, a control of ignition timing by a spark plug not shown, a control of opening of the throttle valve 14, and a control of boost pressure by the turbocharger. In addition to these controls, the engine controller 15 has various self-diagnosis functions including a leak diagnosis for the blowby gas treatment device. The engine controller 15 is connected to a warning light 35, and when determining as a result of the leak diagnosis that an out-of-system leak is present, activates the warning light 35.

The following describes a gas flow in the blowby gas treatment device configured as described above. Under a non-supercharging condition, the downstream side of the throttle valve 14, namely, the inside of the intake collector 17 is subject to a negative pressure. Accordingly, fresh air flows from the intake passage 11 into the crank case 3 via the fresh air induction pipe 21, and thereby serves to ventilate the crank case 3. The blowby gas in the crank case 3 flows into the first oil separator chamber 6 as well as fresh air, and flows from the first oil separator chamber 6 into the intake collector 17 via the second blowby gas pipe 23.

Under a supercharging condition, the intake collector 17, which is downstream of the throttle valve 14, is subject to a positive pressure, so that it becomes impossible to treat blowby gas through the second blowby gas pipe 23. Accordingly, under the supercharging condition, the opening of the pressure control valve 18 is controlled by the engine controller 15 to a suitable position, thereby causing a negative pressure in the region between the pressure control valve 18 and the compressor 13. The negative pressure causes fresh air to flow from the intake passage 11 into the crank case 3 via the fresh air induction pipe 21, and causes blowby gas in the crank case 3 to circulate from the first oil separator chamber 6 into the upstream side of the compressor 13 via the first blowby gas pipe 22.

The following describes a leak diagnosis for detecting a leak in the blowby gas treatment device due to occurrence of a hole in the pipes 21, 22, 23 or detachment of the pipes 21, 22, 23.

Figure 2:
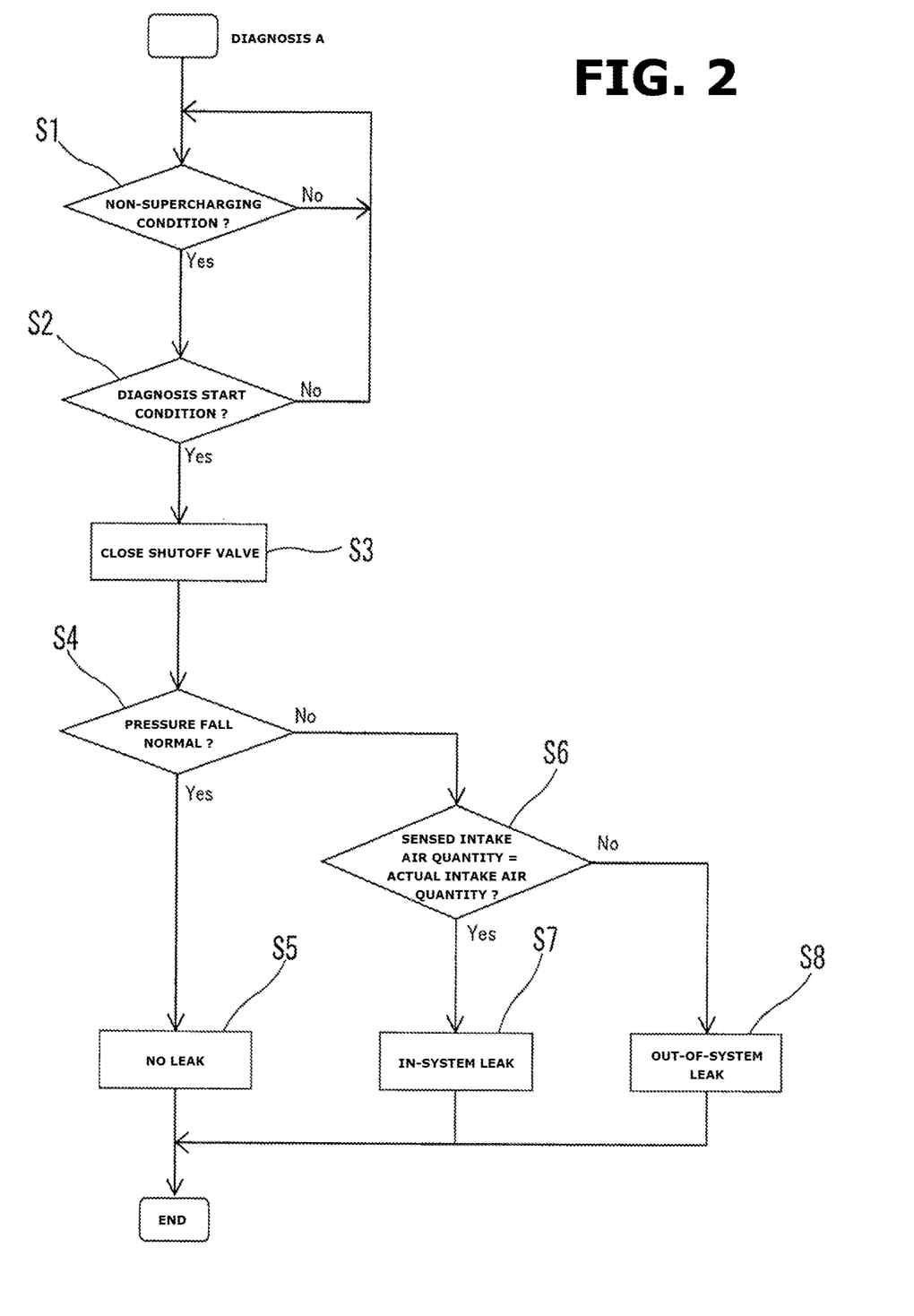
FIG. 2 is a flowchart showing a flow of processing of a leak diagnosis A performed under a non-supercharging condition.
Figure 5:
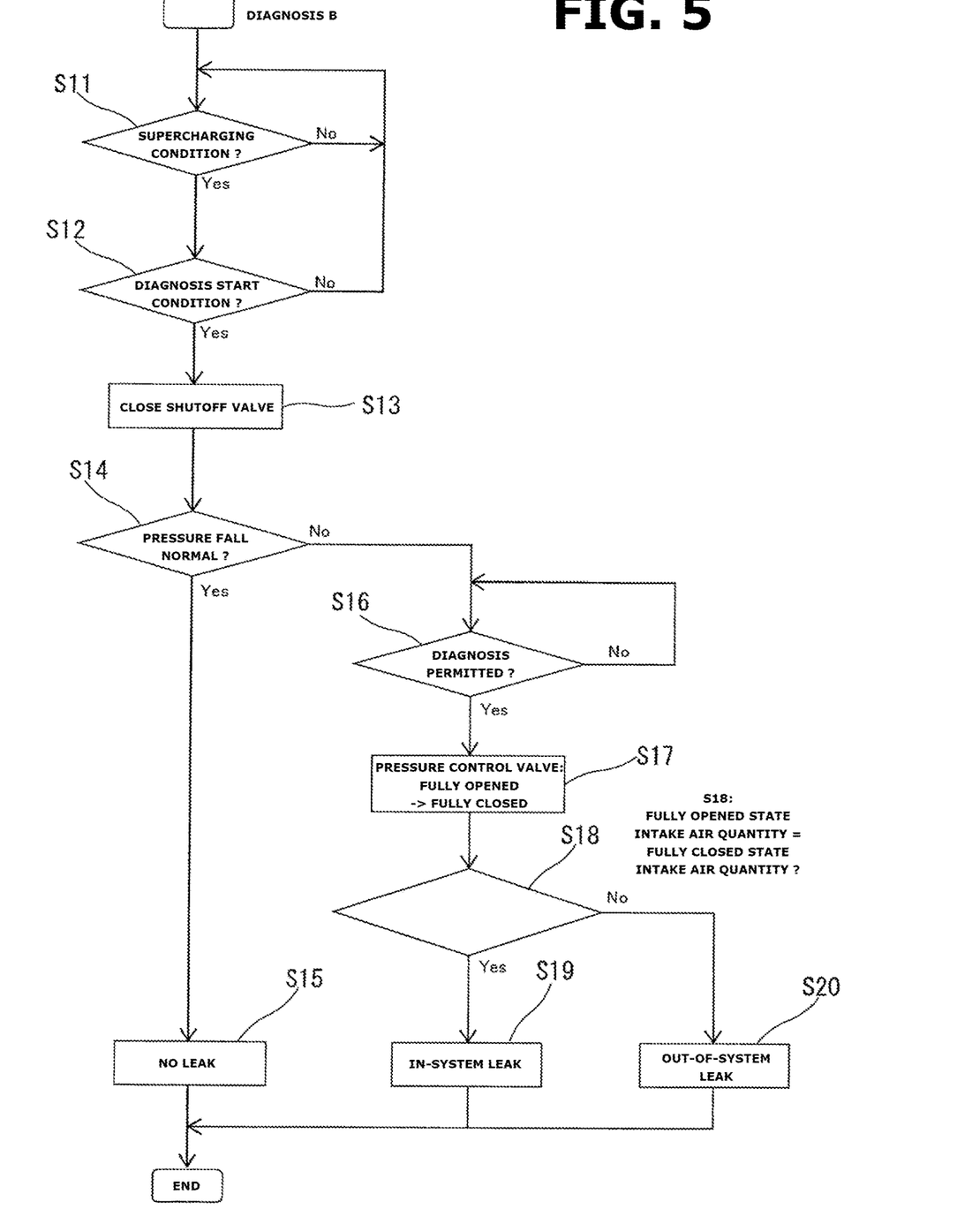
FIG. 5 is a flowchart showing a flow of processing of a leak diagnosis B started under a supercharging condition.

The present embodiment includes a leak diagnosis A performed under the non-supercharging condition, and a leak diagnosis B started under the supercharging condition. FIG. 2 is a flowchart showing a flow of processing of the leak diagnosis A, and FIG. 5 is a flowchart showing a flow of processing of the leak diagnosis B. The leak diagnosis B according to the present invention is an arbitrary diagnosis that is performed additionally. First, the following describes the leak diagnosis A with reference to the flowchart of FIG. 2.

The leak diagnosis A is performed at a suitable frequency, for example, once a trip. At Step 1, it is determined whether or not it is under the non-supercharging condition. This determination may be based on the load and rotational speed of the internal combustion engine 1, or may be based on determination by using the boost pressure sensor 20 whether or not the intake pressure is actually a negative pressure. When it is under the non-supercharging condition, the process proceeds from Step 1 to Step 2. At Step 2, it is determined whether or not a diagnosis start condition is satisfied. When the operating condition (load, rotational speed) of the internal combustion engine 1 or conditions such as the cooling water temperature satisfies a specific condition, and the leak diagnosis A is not yet performed during the current trip, the diagnosis start condition is regarded as satisfied to permit the diagnosis to be started. Under the diagnosis start condition, the throttle valve 14 has an opening suitable for generating a negative pressure downstream of the throttle valve 14. When the answer to Step 2 becomes YES, the process proceeds to Step 3. At Step 3, a first stage diagnosis (corresponding to a first diagnosis recited in the claims) is implemented by closing the shutoff valve 24 in the fresh air induction pipe 21, and monitoring by the crank case pressure sensor 8 changes in pressure in the crank case 3 after the closing of the shutoff valve 24.

Figure 3:
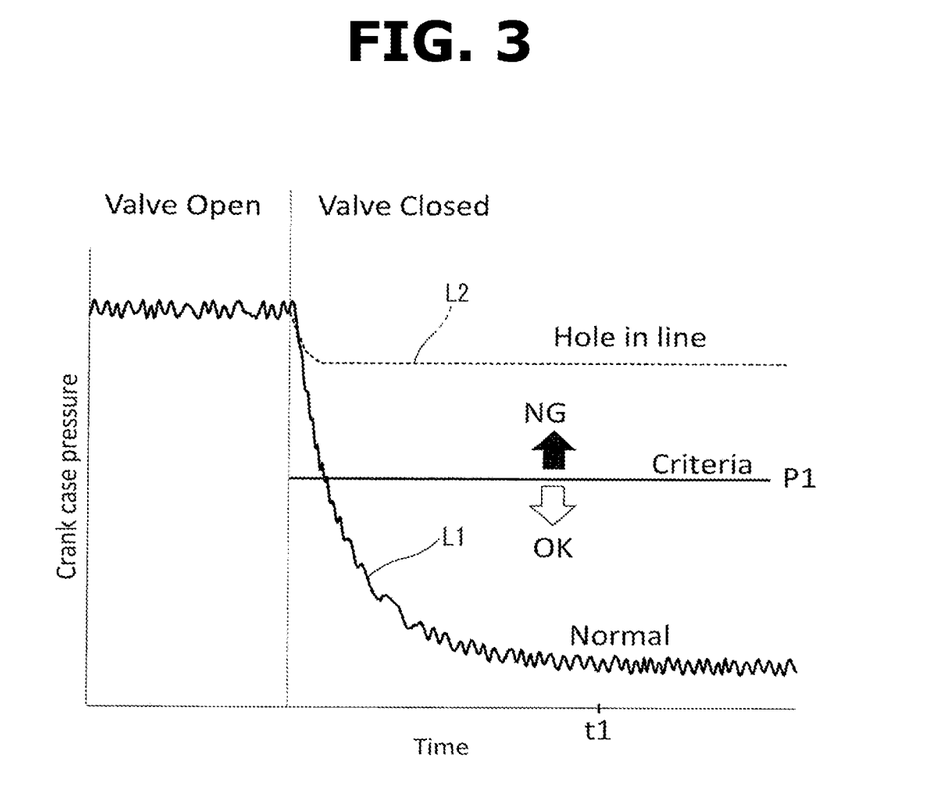
FIG. 3 is a time chart showing behavior of pressure falling in a crank case during a first stage of the leak diagnosis A.

The fresh air induction pipe 21 is blocked by the shutoff valve 24, and the negative pressure in the intake collector 17 is applied to the inside of the crank case 3 via the second blowby gas pipe 23, so that the pressure in the crank case 3 gradually falls when in normal state, namely, when no leak is present. With a leak, the pressure falling becomes insufficient. Incidentally, an inflow of fresh air through the first blowby gas pipe 22 (an inverse flow through the first blowby gas pipe 22) is prevented by the one-way valve 25. In FIG. 3, a line L1 indicates an example of pressure falling when in normal state, and a line L2 indicates an example of pressure falling when a leak is present. For distinguishing them from each other, a pressure value P1 is set as a suitable threshold value. The pressure value P1 may be constant, or may be set variable in accordance with the operating condition (diagnosis start condition).

At Step 4, it is determined whether or not the pressure falls to the pressure value P1, at a time instant t1 in FIG. 3, namely, a suitable delay time after the closing of the shutoff valve 24. The delay time is several seconds in this example. When the answer to Step 4 is YES, the process proceeds to Step 5. At Step 5, it is determined that no leak (no leak to the outside of the system, and no leak within the system) is present, and the leak diagnosis A is terminated.

On the other hand, when the answer to Step 4 is NO, it means that the first stage diagnosis determines presence of an abnormality, and in order to distinguish the out-of-system leak and the in-system leak from each other, a second stage diagnosis composed of Step 6 and the following steps (corresponding to a second diagnosis in the claims) is further performed. In the shown example, since the second stage diagnosis is performed subsequent to the first stage diagnosis, the operating condition of the internal combustion engine 1 is under the non-supercharging condition.

At Step 6, it is determined whether or not the intake air quantity measured by the air flow meter 19 (namely, the sensed intake air quantity) is equal to an actual intake air quantity flowing into the cylinders of the internal combustion engine 1. This comparison is given a suitable allowable error. In this example, this is implemented by determining whether or not a quantity of increasing correction applied to a basic fuel injection quantity based on the sensed intake air quantity is greater than or equal to a predetermined level under a feedback control of air fuel ratio based on the air fuel ratio sensor 33.

As is known by the skilled person, in an air fuel feedback control with a target air fuel ratio set to a theoretical air fuel ratio point, the injection quantity injected by the fuel injection valve (specifically, the width of injection pulsing applied to the fuel injection valve) Ti is calculated by the following mathematical expression using the basic fuel injection quantity Tp that is calculated from the sensed intake air quantity and the engine rotational speed.

$$Ti = Tp \cdot (\alpha + \alpha m) \cdot K + Ts$$

where α represents a feedback correction coefficient that is calculated in succession by PID control or the like for convergence to the target air fuel ratio with reference to the sensing signal of the air fuel ratio sensor 33; αm represents a correction coefficient learning value that is calculated based on a bias of the feedback correction coefficient α for correspondence to an individual deviation and a timely change, wherein the correction coefficient learning value is allocated to a map defined by load and rotational speed as parameters, and is learned and updated; K represents an increasing correction coefficient such as one relating to the cooling water temperature; and Ts represents a voltage correction component corresponding to a response delay of the fuel injection valve.

Accordingly, the sum (α+αm) of the feedback correction coefficient α and the correction coefficient learning value αm in the mathematical expression corresponds to the quantity of increasing correction applied to the basic fuel injection quantity Tp. As detailed below, when an out-of-system leak is present due to occurrence of a hole in piping and detachment of piping, the actual intake air quantity flowing into the cylinders becomes larger than the sensed intake air quantity measured by the air flow meter 19. In other words, the sensed intake air quantity is measured to be smaller than actual. This causes that during the air fuel ratio feedback control, a control based on the basic fuel injection quantity Tp based on the sensed intake air quantity causes the air fuel ratio to be leaner than the target air fuel ratio (for example, theoretical air fuel ratio). Therefore, the correction quantity (α+αm) is set large. At Step 6, when the correction quantity (α+αm) is smaller than a predetermined value, the answer is YES, namely, it is determined that the sensed intake air quantity is equal to the actual intake air quantity. When the correction quantity (α+αm) is larger than or equal to the predetermined value, the answer is NO, namely, it is determined that the actual intake air quantity is larger than the sensed intake air quantity.

When the answer to Step 6 is YES, namely, when it is determined at Step 6 that the sensed intake air quantity is equal to the actual intake air quantity, the process proceeds to Step 7. At Step 7, it is determined that a leak within the system of the blowby gas treatment device (namely, a failure such as a failure of valve operation or a failure of sealing in the system) is present. In this situation, no blowby gas flows out to the external environment, and error information is stored in a memory of the engine controller 15 without activation of the warning light 35.

When the answer to Step 6 is NO, namely, when it is determined at Step 6 that the actual intake air quantity is larger than the sensed intake air quantity, the process proceeds to Step 8. At Step 8, it is determined that a leak to the outside of the system of the blowby gas treatment device (occurrence of a hole in piping or detachment of piping) is present. In this situation, the warning light 35 is activated for informing the driver.

The in-system leak is typically due to open-state sticking of the one-way valve 25 in the first blowby gas pipe 22 (state where the inverse flow cannot be prevented).

During the first stage diagnosis, the pressure in the crank case 3 gradually falls, as the fresh air induction pipe 21 is blocked by the shutoff valve 24 and a negative pressure is applied to the intake collector 17 via the second blowby gas pipe 23. When the one-way valve 25 is stuck in the open state, fresh air flows from the intake passage 11 into the crank case 3 via the first blowby gas pipe 22, so that the pressure falling in the crank case 3 becomes insufficient. Accordingly, the first stage diagnosis (Step 4) determines presence of an abnormality.

However, even when the one-way valve 25 is stuck in the open state, fresh air flowing from the first blowby gas pipe 22 into the first oil separator chamber 6 flows into the intake collector 17 via the second blowby gas pipe 23, and is finally supplied to the combustion chambers 2. The fresh air flowing through the second blowby gas pipe 23 passes through the air flow meter 19, and is thereby measured as a part of the intake air quantity by the air flow meter 19. Therefore, even when the one-way valve 25 is stuck in the open state, the sensed intake air quantity measured by the air flow meter 19 is basically equal to the actual intake air quantity flowing into the cylinders of the internal combustion engine 1.

In other words, without an out-of-system leak such as one due to occurrence of a hole, even with an in-system leak such as one due to open-state sticking of the one-way valve 25, all of the fresh air flowing into the combustion chambers 2 passes through the air flow meter 19 and is measured by the air flow meter 19, so that the actual intake air quantity does not deviate significantly from the sensed intake air quantity.

In contrast, with occurrence of a hole in any one of the pipes, the negative pressure occurring downstream of the throttle valve 14 causes outside air to inflow via the hole and be finally induced into the combustion chambers 2. The outside air inflowing via the hole does not pass through the air flow meter 19, and is not measured by the air flow meter 19. Accordingly, as compared with the actual intake air quantity flowing into the cylinders of the internal combustion engine 1, the sensed intake air quantity measured by the air flow meter 19 becomes relatively small. Therefore, by performing the second stage diagnosis in addition to the first stage diagnosis, it is possible to reliably identify a leak to the outside of the system.

Figure 4:
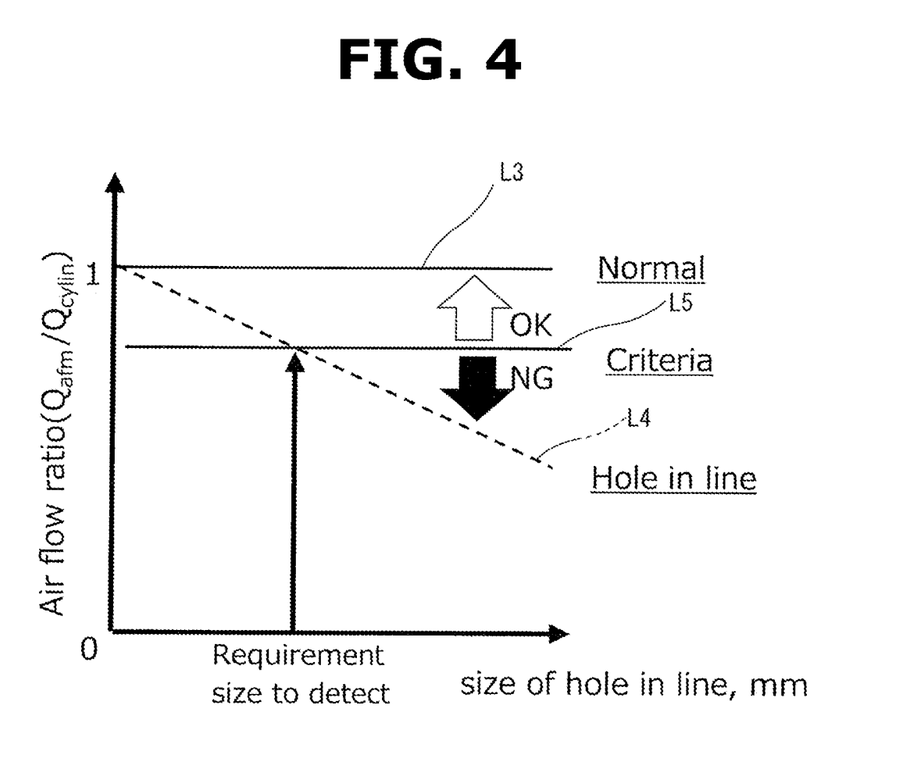
FIG. 4 is a characteristic diagram showing a change in an intake air quantity during a second stage of the leak diagnosis A.

FIG. 4 shows a relationship between a ratio (Qafm/Qcylin) between the sensed intake air quantity (Qafm) and the actual intake air quantity (Qcylin) and an equivalent diameter of the opening of a hole in piping. Without an out-of-system leak such as one due to occurrence of a hole, the ratio (Qafm/Qcylin) is maintained at 1 as indicated by a line L3. With occurrence of a hole in piping, the ratio (Qafm/Qcylin) becomes equal to a value smaller than 1 as indicated by a line L4, wherein the value decreases as the equivalent diameter increases. Accordingly, a threshold value is set as indicated by a line L5 in accordance with a setpoint of the equivalent diameter, wherein based on the threshold value, a leak to the outside of the system is identified.

During the leak diagnosis A shown in FIG. 2, when the presence of an abnormality is determined by the first stage diagnosis (No at Step 4), the process proceeds to the second stage diagnosis. However, the first stage diagnosis and the second stage diagnosis may be performed individually from each other, and thereafter the results of both may be combined to obtain a similar final result of diagnosis.

Although the comparison at Step 6 between the sensed intake air quantity and the actual intake air quantity is based on the correction quantity (α+αm) of the air fuel ratio feedback control in the foregoing example, the actual intake air quantity may be calculated based on the sensed value of the boost pressure sensor 20 at the intake collector 17, and compared with the sensed intake air quantity.

Next, the following describes the processing of the leak diagnosis B with reference to the flowchart of FIG. 5, wherein the leak diagnosis B is performed additionally.

The leak diagnosis B is performed at a suitable frequency, for example, once a trip. At Step 11, it is determined whether or not it is under the supercharging condition. This determination may be based on the load and rotational speed of the internal combustion engine 1, or may be based on determination by using the boost pressure sensor 20 whether or not the intake pressure is actually a positive pressure. When it is under the supercharging condition, the process proceeds from Step 11 to Step 12. At Step 12, it is determined whether or not a diagnosis start condition is satisfied. When the operating condition (load, rotational speed) of the internal combustion engine 1 or conditions such as the cooling water temperature satisfies a specific condition, and the leak diagnosis B is not yet performed during the current trip, the diagnosis start condition is regarded as satisfied to permit the diagnosis to be started. Under the diagnosis start condition, the throttle valve 14 is controlled to have an opening suitable for generating a negative pressure downstream of the throttle valve 14. When the answer to Step 12 becomes YES, the process proceeds to Step 13. At Step 13, a first stage diagnosis is implemented by closing the shutoff valve 24 in the fresh air induction pipe 21, and monitoring by the crank case pressure sensor 8 changes in pressure in the crank case 3 after the closing of the shutoff valve 24.

Figure 6:
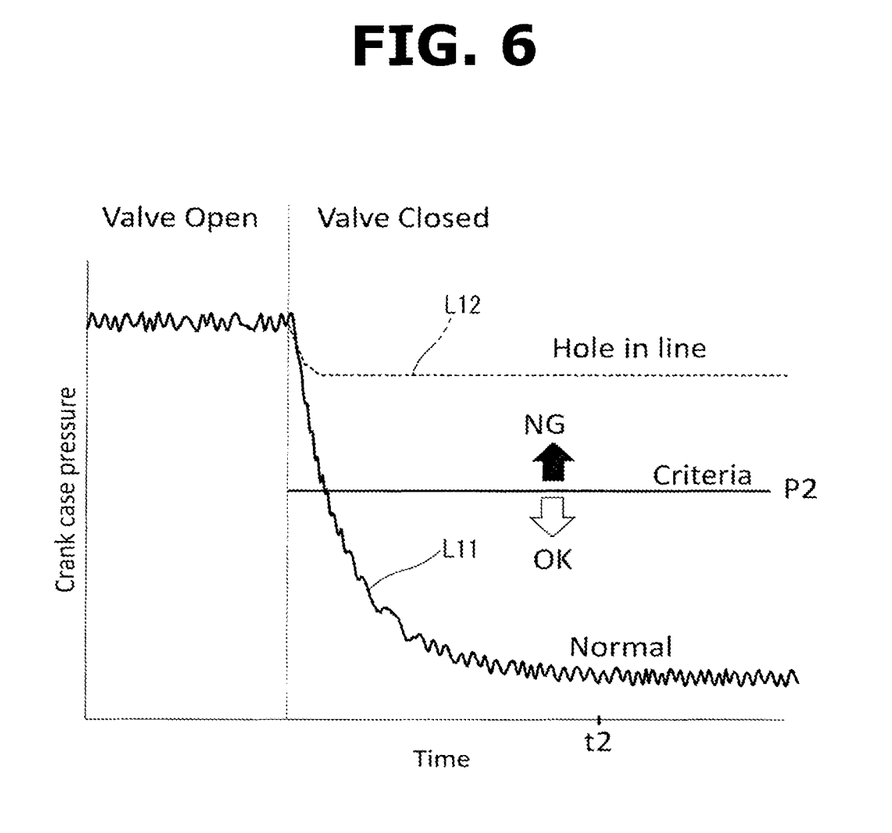
FIG. 6 is a time chart showing behavior of pressure falling in the crank case during a first stage of the leak diagnosis B.

The fresh air induction pipe 21 is blocked by the shutoff valve 24, and the negative pressure in the intake collector 17 is applied to the inside of the crank case 3 via the first blowby gas pipe 22, so that the pressure in the crank case 3 gradually falls when in normal state, namely, when no leak is present. With a leak, the pressure falling becomes insufficient. Incidentally, an inflow of fresh air through the second blowby gas pipe 23 (an inverse flow through the second blowby gas pipe 23) is prevented by the PCV valve 26. In FIG. 6, a line L11 indicates an example of pressure falling when in normal state, and a line L12 indicates an example of pressure falling when a leak is present. For distinguishing them from each other, a pressure value P2 is set as a suitable threshold value. The pressure value P2 may be constant, or may be set variable in accordance with the operating condition (diagnosis start condition).

At Step 14, it is determined whether or not the pressure falls to the pressure value P2, at a time instant t2 in FIG. 6, namely, a suitable delay time after the closing of the shutoff valve 24. The delay time is several seconds in this example. When the answer to Step 14 is YES, the process proceeds to Step 15. At Step 15, it is determined that no leak (no leak to the outside of the system, and no leak within the system) is present, and the leak diagnosis B is terminated.

On the other hand, when the answer to Step 14 is NO, it means that the first stage diagnosis determines presence of an abnormality, and in order to distinguish the out-of-system leak and the in-system leak from each other, a second stage diagnosis composed of Step 16 and the following steps is further performed. At Step 16, it is determined whether or not a condition for permitting the second stage diagnosis is satisfied. The second stage diagnosis is performed under the non-supercharging condition, specifically under an operating condition in which the intake air quantity is allowed to rapidly decrease, preferably during fuel-cut operation while the vehicle is decelerating with the accelerator opening being equal to zero. In this example, at Step 16, it is determined whether or not fuel-cut operation is being performed. In case where the internal combustion engine 1 is of a hybrid electric vehicle and motoring of the internal combustion engine 1 can be performed by an electric motor, it is also preferable to perform the second stage diagnosis during motoring of the internal combustion engine 1. Incidentally, under the non-supercharging condition, the pressure control valve 18 is fully opened basically.

When the second stage diagnosis is permitted at Step 16, the process proceeds to Step 17. At Step 17, the pressure control valve 18 is controlled continuously from a fully opened state into a fully closed state, and at each state, a fully opened state intake air quantity (Qopen) and a fully closed state intake air quantity (Qclose) are measured by the air flow meter 19. Next, the process proceeds to Step 18. At Step 18, it is determined whether or not the fully opened state intake air quantity is equal to the fully closed state intake air quantity. This determination is substantially equal to determining whether or not the fully closed state intake air quantity is measured to be less than the fully opened state intake air quantity. This comparison in magnitude is given a suitable allowable error.

When the answer to Step 18 is YES, namely, when the fully opened state intake air quantity is equal to the fully closed state intake air quantity, the process proceeds to Step 19. At Step 19, it is determined that a leak within the system of the blowby gas treatment device (namely, a failure such as a failure of valve operation or a failure of sealing in the system), which is not an out-of-system leak, is present. In this situation, no blowby gas flows out to the external environment, and error information is stored in a memory of the engine controller 15 without activation of the warning light 35.

When the answer to Step 18 is NO, namely, when it is determined at Step 18 that the fully opened state intake air quantity and the fully closed state intake air quantity are different from each other, the process proceeds to Step 20. At Step 20, it is determined that a leak to the outside of the system of the blowby gas treatment device (occurrence of a hole in piping or detachment of piping) is present. In this situation, the warning light 35 is activated for informing the driver.

The in-system leak is typically due to closed-state sticking of the one-way valve 25 in the first blowby gas pipe 22 (state where the one-way valve 25 cannot be opened sufficiently), or due to open-state sticking of the PCV valve 26 in the second blowby gas pipe 23 (state where the inverse flow cannot be prevented).

Figure 8:
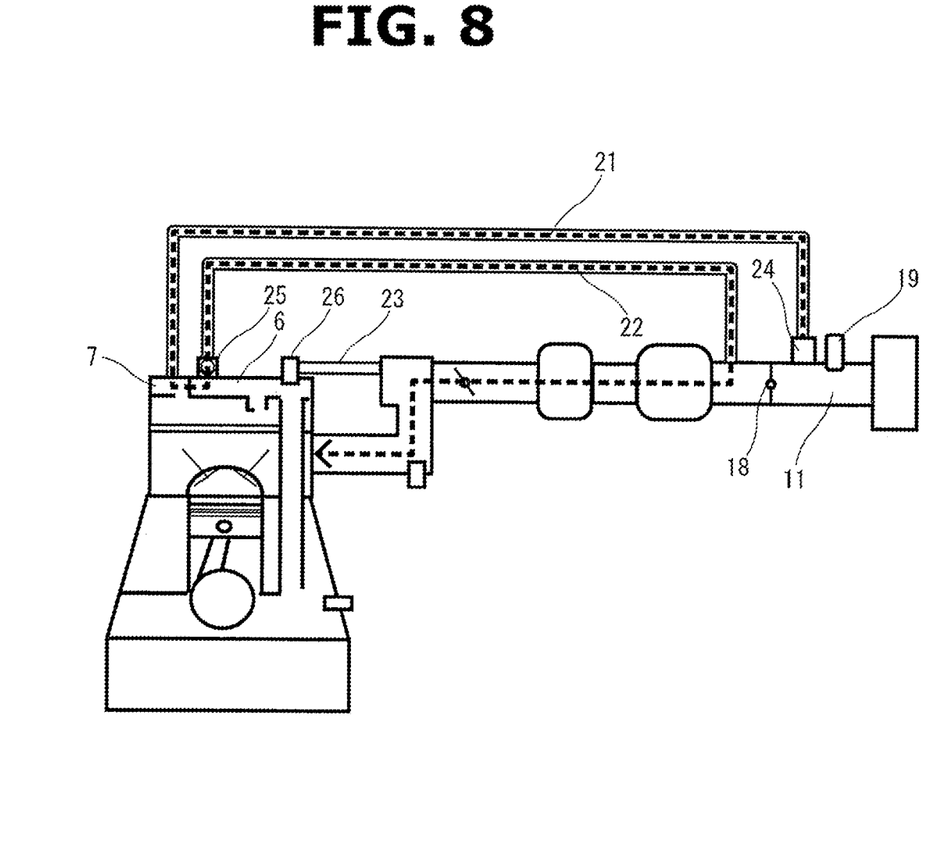
FIG. 8 is an explanatory diagram showing a gas flow when a pressure control valve is fully closed during the second stage of the leak diagnosis B.

FIG. 8 shows a basic flow of gas (fresh air passing through the air flow meter 19 and measured) when the pressure control valve 18 is fully closed. As indicated by a dotted arrow in FIG. 8, when the pressure control valve 18 is fully closed, the flow to the downstream side of the pressure control valve 18 in the intake passage 11 is blocked, and fresh air flows via the fresh air induction pipe 21 into the second oil separator chamber 7, and flows along a shortcut path in the crank case 3, and returns from the first oil separator chamber 6 into the intake passage 11 (the downstream side of the pressure control valve 18) via the first blowby gas pipe 22. Accordingly, on the assumption that the rotational speed of the internal combustion engine 1 is constant, the fully opened state intake air quantity and the fully closed state intake air quantity, which are measured by the air flow meter 19, are equal to each other.

In other words, without a leak to the outside of the system such as a leak due to occurrence of a hole, both when the pressure control valve 18 is in the fully opened state and when the pressure control valve 18 is in the fully closed state, all of the fresh air flowing into the combustion chambers 2 passes through the air flow meter 19 and is thereby measured by the air flow meter 19, so that the fully closed state intake air quantity is unchanged with respect to the fully opened state intake air quantity.

In contrast, with occurrence of a hole in any one of the pipes, the negative pressure occurring downstream of the throttle valve 14 causes outside air to inflow via the hole and be finally induced into the combustion chambers 2. The outside air inflowing via the hole does not pass through the air flow meter 19, and is not measured by the air flow meter 19. As the fully opened state of the pressure control valve 18 is compared with the fully closed state of the pressure control valve 18, as shown in FIG. 8, the proportion of intake air quantity added via the hole in the pipe is larger when the pressure control valve 18 is in the fully closed state, so that the fully closed state intake air quantity measured by the air flow meter 19 is smaller than the fully opened state intake air quantity. Therefore, by performing the second stage diagnosis in addition to the first stage diagnosis, it is possible to reliably identify a leak to the outside of the system.

Figure 7:
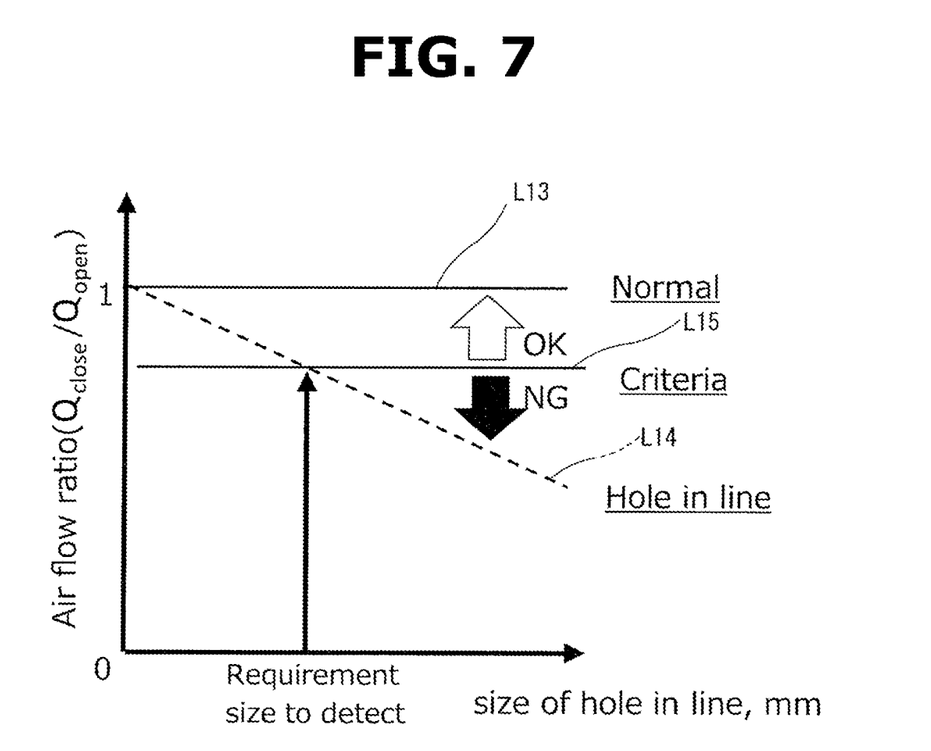
FIG. 7 is a characteristic diagram showing a change in the intake air quantity during a second stage of the leak diagnosis B.

FIG. 7 shows a relationship between a ratio (Qclose/Qopen) between the fully opened state intake air quantity (Qopen) and the fully closed state intake air quantity (Qclose) and an equivalent diameter of the opening of a hole in piping. Without an out-of-system leak such as one due to occurrence of a hole, the ratio (Qclose/Qopen) is maintained at 1 as indicated by a line L13. With occurrence of a hole in piping, the ratio (Qclose/Qopen) becomes equal to a value smaller than 1 as indicated by a line L14, wherein the value decreases as the equivalent diameter increases. Accordingly, a threshold value is set as indicated by a line L15 in accordance with a setpoint of the equivalent diameter, wherein based on the threshold value, a leak to the outside of the system is identified.

On the other hand, with closed-state sticking of the one-way valve 25 in the first blowby gas pipe 22, during the first stage diagnosis, the negative pressure occurring downstream of the pressure control valve 18 is not applied to the inside of the crank case 3, and the pressure falling becomes insufficient, so that the answer to Step 14 is determined as NO (abnormal). However, during the second state diagnosis, fresh air does not return via the first blowby gas pipe 22 to the intake passage 11, but returns to the intake collector 17 via the second blowby gas pipe 23. Therefore, the fully opened state intake air quantity and the fully closed state intake air quantity are measured to be substantially equal to each other.

Similarly, in case of open-state sticking of the PCV valve 26, the second blowby gas pipe 23 is in a state allowing communication, so that the first stage diagnosis determines the pressure fall as insufficient, and the answer to Step 14 becomes NO (abnormal). However, during the second stage diagnosis, there is no gas movement between the system and the external environment, so that the fully opened state intake air quantity and the fully closed state intake air quantity are calculated as substantially equal to each other.

In the foregoing embodiment, when the presence of an abnormality is determined by the first stage diagnosis (No at Step 14), the process proceeds to the second stage diagnosis. However, the first stage diagnosis and the second stage diagnosis may be performed individually from each other, and thereafter the results of both may be combined to obtain a similar final result of diagnosis.

Furthermore, the sensing of the fully opened state intake air quantity and the sensing of the fully closed state intake air quantity are not limited to the process where they are performed in succession. For example, the sensing of the fully opened state intake air quantity and the sensing of the fully closed state intake air quantity may be performed individually in respective suitable timings.

In the foregoing embodiment, the leak diagnosis A is performed under the non-supercharging condition and the leak diagnosis B is performed such that the first stage diagnosis is performed under the supercharging condition and thereafter the second stage diagnosis is performed under the non-supercharging condition (preferably, during fuel cut operation or during motoring).

The present embodiment where the leak diagnosis A and the leak diagnosis B are both performed serves to enhance the accuracy of the leak diagnosis and reduce the frequency of incorrect determination. As required, it may be implemented by appropriately combining the result of the leak diagnosis A and the result of the leak diagnosis B.

For example, at Step 5 in the leak diagnosis A (presence of no leak is determined), it is possible to determine no occurrence of a hole in a pipe system including at least the fresh air induction pipe 21 and the second blowby gas pipe 23, whereas at Step 15 in the leak diagnosis B, it is possible to determine no occurrence of a hole in a pipe system including at least the fresh air induction pipe 21 and the first blowby gas pipe 22. Furthermore, open-state sticking of the one-way valve 25 can be detected by the leak diagnosis A, whereas closed-state sticking of the one-way valve 25 can be detected by the leak diagnosis B.

The invention claimed is:

1. A leak diagnosis method for a blowby gas treatment device of an internal combustion engine, wherein the blowby gas treatment device includes: a fresh air induction pipe structured to induce fresh air into a crank case from a section of an intake passage downstream of an air flow meter; a first blowby gas pipe structured to induce blowby gas from the crank case into a section of the intake passage upstream of a compressor; a second blowby gas pipe structured to induce blowby gas from the crank case into a section of the intake passage downstream of the compressor and downstream of a throttle valve; a shutoff valve structured to block the fresh air induction pipe; and a one-way valve structured to allow only a gas flow in the first blowby gas pipe from the crank case to the intake passage; the leak diagnosis method comprising:

performing a first diagnosis to close the shutoff valve under a non-supercharging condition and determine whether falling of a pressure in the crank case after the closing of the shutoff valve is normal or abnormal;

performing a second diagnosis to determine whether or not a sensed intake air quantity is equal to an actual intake air quantity under the non-supercharging condition, wherein the sensed intake air quantity is a quantity of intake air sensed in the intake passage, and wherein the actual intake air quantity is a quantity of intake air flowing into a cylinder set;

determining presence of a leak to an outside of a system of the blowby gas treatment device, in response to a condition that the first diagnosis determines the falling of the pressure as abnormal and the second diagnosis determines the sensed intake air quantity as unequal to the actual intake air quantity; and determining presence of a failure within the system of the blowby gas treatment device, in response to a condition that the first diagnosis determines the falling of the pressure as abnormal and the second diagnosis determines the sensed intake air quantity as equal to the actual intake air quantity.

2. The leak diagnosis method as claimed in claim 1, comprising:
performing the first diagnosis prior to the second diagnosis; and
performing the second diagnosis subsequent to a determination by the first diagnosis that the falling of the pressure is abnormal.

3. The leak diagnosis method as claimed in claim 1, wherein the second diagnosis is implemented by determining the actual intake air quantity as larger than the sensed intake air quantity, in response to a condition that under an air fuel ratio control to measure an exhaust air fuel ratio and feedback-control a fuel injection quantity so as to control the exhaust air fuel ratio to an air fuel ratio setpoint, a quantity of increasing correction is greater than or equal to a predetermined level, wherein the quantity of increasing correction is a quantity applied to a basic fuel injection quantity, wherein the basic fuel injection quantity depends on the sensed intake air quantity.

4. The leak diagnosis method as claimed in claim 1, wherein the second diagnosis is implemented by sensing an intake pressure downstream of the throttle valve, calculating the actual intake air quantity based on the sensed intake pressure, and comparing the actual intake air quantity with the sensed intake air quantity.

5. The leak diagnosis method as claimed in claim 1, comprising:
determining the failure within the system as a failure due to open-state sticking of the one-way valve.

6. The leak diagnosis method as claimed in claim 1, comprising:
activating a warning light in response to a determination of presence of a leak to the outside of the system of the blowby gas treatment device; and
inactivating the warning light in response to a determination of presence of a failure within the system of the blowby gas treatment device.

7. An internal combustion engine blowby gas treatment device leak diagnosis device comprising:
an internal combustion engine including a compressor in an intake passage for supercharging;
a blowby gas treatment device including:
a fresh air induction pipe structured to induce fresh air into a crank case from a section of the intake passage downstream of an air flow meter;
a first blowby gas pipe structured to induce blowby gas from the crank case into a section of the intake passage upstream of the compressor;
a second blowby gas pipe structured to induce blowby gas from the crank case into a section of the intake passage downstream of the compressor and downstream of a throttle valve;
a shutoff valve structured to block the fresh air induction pipe; and
a one-way valve structured to allow only a gas flow in the first blowby gas pipe from the crank case to the intake passage; and
a control section configured to diagnose leaking of the blowby gas treatment device, wherein the control section is configured to:
perform a first diagnosis to close the shutoff valve under a non-supercharging condition and determine whether falling of a pressure in the crank case after the closing of the shutoff valve is normal or abnormal;
perform a second diagnosis to determine whether or not a sensed intake air quantity is equal to an actual intake air quantity under the non-supercharging condition, wherein the sensed intake air quantity is a quantity of intake air sensed in the intake passage, and wherein the actual intake air quantity is a quantity of intake air flowing into a cylinder set;
determine presence of a leak to an outside of a system of the blowby gas treatment device, in response to a condition that the first diagnosis determines the falling of the pressure as abnormal and the second diagnosis determines the sensed intake air quantity as unequal to the actual intake air quantity; and
determine presence of a failure within the system of the blowby gas treatment device, in response to a condition that the first diagnosis determines the falling of the pressure as abnormal and the second diagnosis determines the sensed intake air quantity as equal to the actual intake air quantity.

* * * * *